US012117760B2

(12) United States Patent
Takayama et al.

(10) Patent No.: US 12,117,760 B2
(45) Date of Patent: Oct. 15, 2024

(54) IMAGE FORMING APPARATUS HAVING A COVER TO COVER IMAGE FORMING UNITS

(71) Applicant: CANON KABUSHIKI KAISHA, Tokyo (JP)

(72) Inventors: Hiroki Takayama, Chiba (JP); Yuki Tashiro, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/186,598

(22) Filed: Mar. 20, 2023

(65) Prior Publication Data

US 2023/0305483 A1 Sep. 28, 2023

(30) Foreign Application Priority Data

Mar. 28, 2022 (JP) ................................ 2022-052238

(51) Int. Cl.
*G03G 21/00* (2006.01)
*G03G 21/16* (2006.01)
*G03G 21/20* (2006.01)

(52) U.S. Cl.
CPC ....... *G03G 21/1633* (2013.01); *G03G 21/206* (2013.01); *G03G 2221/1645* (2013.01)

(58) Field of Classification Search
CPC ............. G03G 21/1633; G03G 21/206; G03G 21/185; G03G 2221/1645; G03G 2221/169
USPC .................................................... 399/92, 111
See application file for complete search history.

(56) References Cited

U.S. PATENT DOCUMENTS

2007/0104509 A1* 5/2007 Kabashima .......... G03G 21/206 399/388
2009/0123173 A1* 5/2009 Kadowaki ............ G03G 21/206 399/92
2011/0116826 A1* 5/2011 Nishikawa ........... G03G 21/206 165/104.34
2011/0206408 A1* 8/2011 Brown ................. G03G 21/206 399/92
2011/0280609 A1* 11/2011 Nakazawa ........... G03G 21/206 399/92
2012/0230720 A1* 9/2012 Murano ............... G03G 21/206 399/92

(Continued)

FOREIGN PATENT DOCUMENTS

JP 2021047344 A 3/2021

*Primary Examiner* — Robert B Beatty
(74) *Attorney, Agent, or Firm* — Canon U.S.A., Inc. IP Division

(57) ABSTRACT

An image forming apparatus includes first, second, and third covers, first and second ducts, and a plurality of image forming units, including first and second image forming units. The second cover is between the first cover and the plurality of image forming units to cover the plurality of image forming units. The first duct is disposed on the second cover to guide air absorbed from outside of the image forming apparatus through an air intake to the first image forming unit. The second duct is disposed on the second cover to guide air absorbed from the outside of the image forming apparatus through the air intake to the second image forming unit. The third cover is attachable to and detachable from the second cover to cover an opening of the second cover. At least part of the first image forming unit is insertable and extractable through the opening.

18 Claims, 9 Drawing Sheets

(56) References Cited

U.S. PATENT DOCUMENTS

| | | | | |
|---|---|---|---|---|
| 2013/0142538 | A1* | 6/2013 | Miwa ................. | G03G 21/1803 399/92 |
| 2014/0205309 | A1* | 7/2014 | Kawasumi ........... | G03G 21/206 399/92 |
| 2016/0004215 | A1* | 1/2016 | Yamashita ............. | G03G 15/20 399/92 |
| 2022/0365480 | A1* | 11/2022 | Kawasumi ......... | G03G 21/1633 |
| 2022/0404763 | A1* | 12/2022 | Tashiro .............. | G03G 15/0258 |
| 2023/0305484 | A1* | 9/2023 | Terakawa ............. | G03G 21/206 |

* cited by examiner

IMAGE FORMING APPARATUS HAVING A COVER TO COVER IMAGE FORMING UNITS

BACKGROUND

Field

The present disclosure relates to an image forming apparatus, such as a printer, a copy machine, a facsimile, and a multi-function peripheral.

Description of the Related Art

Japanese Patent Application Laid-Open No. 2021-047344 discusses an image forming apparatus including an exterior cover and an inside cover behind the exterior cover in a closed state. The exterior cover is openable and closeable. A plurality of image forming units each including a photosensitive drum, a charging device, and a development device is arranged behind the inside cover. The inside cover is provided to prevent a user from accidently touching a power portion and a movable portion of the image forming units in a case where, for example, a recording material is fed unsuccessfully and stuck in a conveyance path to cause a jam and the user opens the exterior cover to remove the stuck recording material.

A commonly-used image forming apparatus includes a fan and many ducts. The fan absorbs outside air, and the ducts guide air absorbed from outside by the fan to, for example, an image forming unit including a charging device and a development device. Air is blown to the image forming unit in order to collect discharge products, such as ozone, generated through the charging by the charging device. Further, air is blown to the image forming unit in order to prevent an increase in temperature of the development device due to a toner agitation operation in the development device.

SUMMARY

According to an aspect of the present disclosure, an image forming apparatus includes a first image forming unit of a plurality of image forming units, the first image forming unit including a first photosensitive member, a first charging unit configured to charge the first photosensitive member, a first exposure unit configured to expose the first photosensitive member charged by the first charging unit to form an electrostatic latent image on the first photosensitive member, and a first development unit configured to develop the electrostatic latent image formed on the first photosensitive member with toner, a second image forming unit of the plurality of image forming units, the second image forming unit including a second photosensitive member, a second charging unit configured to charge the second photosensitive member, a second exposure unit configured to expose the second photosensitive member charged by the second charging unit to form an electrostatic latent image on the second photosensitive member, and a second development unit configured to develop the electrostatic latent image formed on the second photosensitive member with toner, a first cover configured to be opened and closed and forming part of an exterior of the image forming apparatus, a second cover located between the first cover and the plurality of image forming units in a rotational axis direction of the first photosensitive member, the second cover being made of resin and covering the plurality of image forming units, a first duct disposed on the second cover and configured to guide air absorbed from outside of the image forming apparatus through an air intake to the first image forming unit, a second duct disposed on the second cover and configured to guide air absorbed from the outside of the image forming apparatus through the air intake to the second image forming unit, and a third cover configured to be attached, in an attachable and detachable manner, to the second cover to cover an opening of the second cover, at least part of the first image forming unit being insertable and extractable through the opening of the second cover.

Further features of the present disclosure will become apparent from the following description of exemplary embodiments with reference to the attached drawings.

DESCRIPTION OF THE EMBODIMENTS

An image forming apparatus according to the present disclosure will be described below with reference to the drawings. It should be noted that sizes, materials, shapes, and relative positions of components that are described below are not intended to limit the scope of the present disclosure to those described below.

<Image Forming System>

Figure 1:
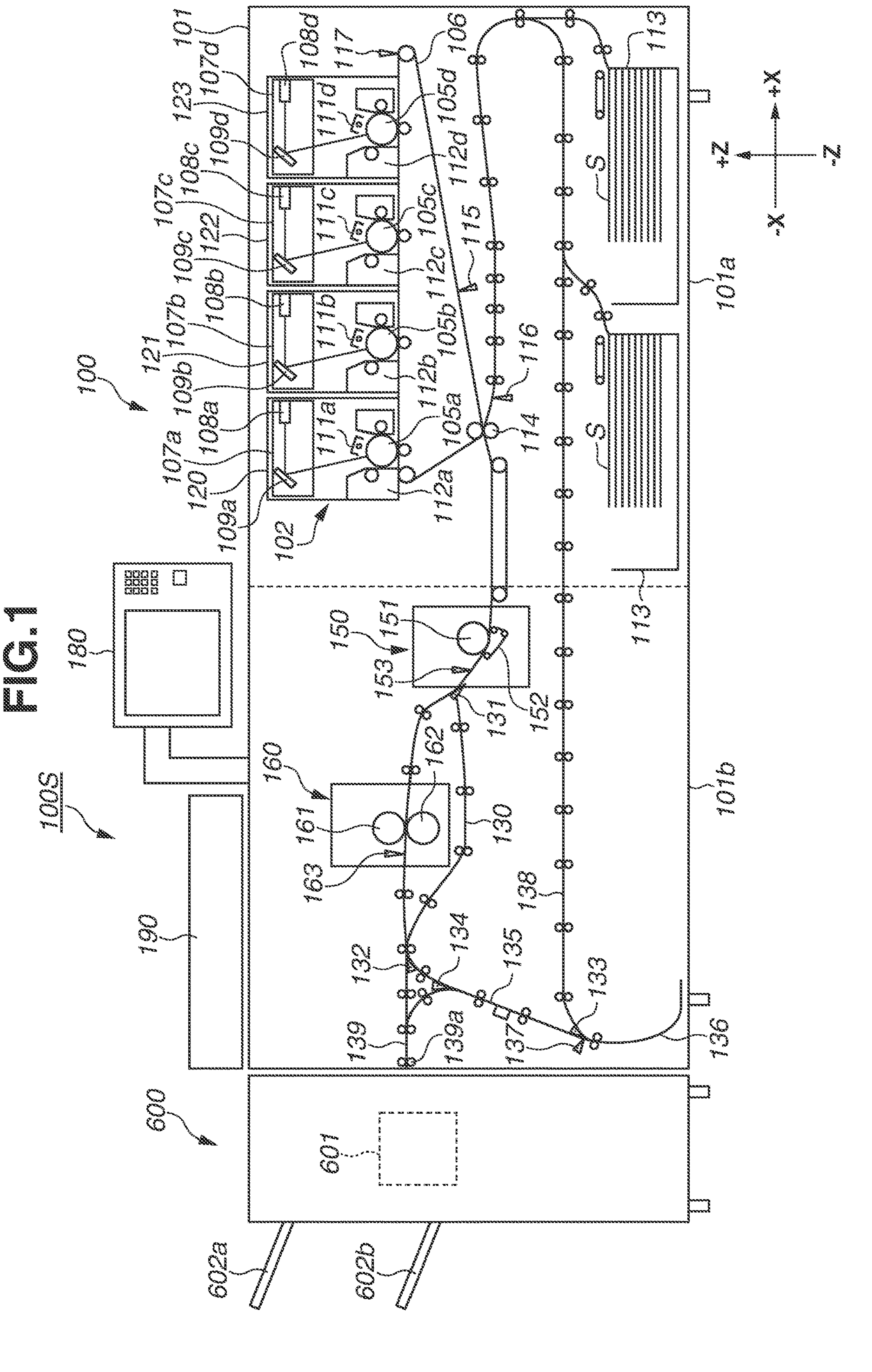
FIG. 1 is a schematic diagram illustrating an image forming system including an image forming apparatus.

A schematic configuration of an image forming system including an image forming apparatus will be described below with reference to FIG. 1. FIG. 1 is a schematic diagram illustrating an image forming system 100S.

The image forming system 100S includes an image forming apparatus 100 and a finisher 600. The finisher 600 functions as a sheet processing apparatus. The image forming apparatus 100 and the finisher 600 are coupled together to pass and receive sheets S. The finisher 600 is an optional unit that can be retrofitted to the image forming apparatus 100 to expand a function and can perform post-processing described below on a recording material sheet S with a toner image fixed thereto by the image forming apparatus 100. The image forming apparatus 100 and the finisher 600 are connected together via a communication interface capable of performing serial communication and parallel communication to transmit and receive data to and from each other.

A housing 101 of the image forming apparatus 100 includes a first housing 101*a* and a second housing 101*b*.

The first housing 101*a* includes an image forming engine 102, an intermediate transfer belt 106, and storages 113 described below.

The second housing 101*b* includes a first fixing device 150, a second fixing device 160, and a reverse conveyance path 135 described below.

The image forming engine 102 includes a plurality of image forming units 120, 121, 122, and 123 and the intermediate transfer belt 106. The image forming units 120, 121, 122, and 123 form yellow, magenta, cyan, and black toner images. The image forming units 120 to 123 are different only in color of toner used and are similar in structure to each other, so that a detailed structure of the image forming unit 120 will be described as an example.

The image forming engine 102 includes a photosensitive member 105*a* having a drum shape, a charging device 111*a*, a development device 112*a*, and a laser scanner unit 107*a*. A corona discharge occurs as an electrical discharge when a current is created between two electrodes brought to a high potential and the current ionizes air separating the electrodes so that the air becomes conductive. The charging device 111*a* charges the photosensitive member 105*a* by ionizing air surrounding a charging wire 502 described below and generating ions by a corona discharge process. The laser scanner unit 107*a* performs exposure processing on the photosensitive member 105*a* based on command signals generated based on image data and transmitted to the laser scanner unit 107*a*.

The laser scanner unit 107*a* includes a laser driver that drives laser light emitted from a semiconductor laser (not illustrated), and the laser light from the semiconductor laser is guided to the photosensitive member 105*a* via a reflection mirror 109*a* while being distributed to a main scan direction by a rotary polygon mirror. Thus, an electrostatic latent image corresponding to the image data is formed on the photosensitive member 105*a*. The laser scanner unit 107*a* includes a dustproof glass as a transparent member and illuminates the photosensitive member 105*a* with the laser light through the dustproof glass, thus forming the electrostatic latent image.

The development device 112*a* stores therein a development agent containing the toner and supplies charged toner particles to the photosensitive member 105*a*. The toner particles adhere to a surface of the photosensitive member 105*a* based on a surface potential distribution, so that the electrostatic latent image borne on the photosensitive member 105*a* is visualized as a toner image. The toner image borne on the photosensitive member 105*a* is transferred (primary transfer) to the intermediate transfer belt 106 to which a voltage having a polarity opposite to a normal charging polarity of the toner is to be applied. The image forming unit 120 is an example of a first image forming unit, and the image forming unit 123 is an example of a second image forming unit. The photosensitive member 105*a* is an example of a first photosensitive member, the charging device 111*a* is an example of a first charging unit, the laser scanner unit 107*a* is an example of a first exposure unit, and the development device 112*a* is an example of a first development unit. A photosensitive member 105*d* is an example of a second photosensitive member, a charging device 111*d* is an example of a second charging unit, a laser scanner unit 107*d* is an example of a second exposure unit, and a development device 112*d* is an example of a second development unit.

In forming a color image, toner images formed by the four image forming units 120 to 123 are transferred on top of another so that the toner images are superimposed on the intermediate transfer belt 106 to form a full-color toner image on the intermediate transfer belt 106.

Meanwhile, a sheet feeding processing mechanism singly feeds a sheet S from the storages 113 to transfer rollers 114. The storages 113 are inserted in the housing 101 of the image forming apparatus 100 in such a manner that the storages 113 can be pulled out from the housing 101. The toner image borne on the intermediate transfer belt 106, which is an intermediate transfer member, is transferred to the sheet S by the transfer rollers 114 (such a transfer is referred to as a secondary transfer).

Near the intermediate transfer belt 106, provided are an image forming start position detection sensor 115 for determining a print start position in performing image forming, a sheet feeding timing sensor 116 for determining a timing to feed the sheet S, and a density sensor 117. The density sensor 117 measures densities of patch images borne on the intermediate transfer belt 106. A printer controller adjusts operational conditions (e.g., a charging target potential setting of the charging device 111*a*, a bias voltage setting of the development device 112*a*) of an optical processing mechanism based on results of detection made by the density sensor 117.

A fixing processing mechanism includes the first fixing device 150 and the second fixing device 160. The first fixing device 150 includes a fixing roller 151 for applying heat to the sheet S, a press belt 152 for pressing the sheet S against the fixing roller 151, and a first post-fixing sensor 153. The first post-fixing sensor 153 detects completion of fixing processing that is performed by the first fixing device 150. Each roller, including the fixing roller 151, is a hollow roller and includes a heater therein. The first fixing device 150 applies heat and pressure to the toner image on the sheet S while the sheet S is sandwiched between the fixing roller 151 and the press belt 152, which are a pair of rotary members, and conveyed. This melts the toner particles and thereafter fixes the toner particles, so that the image is fixed to the sheet S.

The second fixing device 160 is situated downstream of the first fixing device 150 in a conveyance path of the sheet S. The second fixing device 160 has a function of increasing a gloss level of the image fixed by the first fixing device 150 and ensuring that the image is fixed to the sheet S. As in the first fixing device 150, the second fixing device 160 includes a fixing roller 161, a press roller 162, and a second post-fixing sensor 163. The fixing roller 161 and the press roller 162 are a pair of rotary members that apply heat and pressure to the sheet S while conveying the sheet S. The second post-fixing sensor 163 detects completion of fixing processing by the second fixing device 160.

There is a case where the sheet S does not have to be passed through the second fixing device 160 depending on the type of the sheet S. In order to reduce energy consumption in this case, the image forming apparatus 100 includes an alternative conveyance path 130 for discharging the sheet S with the sheet S being not conveyed through the second fixing device 160. The sheet S output from the first fixing device 150 is guided to the second fixing device 160 or the alternative conveyance path 130 by a first switch flap 131.

The sheet S conveyed through the second fixing device 160 or the alternative conveyance path 130 is guided to a discharge conveyance path 139 or the reverse conveyance path 135 by a second switch flap 132. A position of the sheet S conveyed into the reverse conveyance path 135 is detected by a reverse sensor 137, and leading and trailing edges of the sheet S in the sheet conveyance direction are reversed by a switchback operation performed by a reverse portion 136. In two-sided printing, the sheet S with an image formed on a first surface of the sheet S in a state where the leading and trailing edges of the sheet S are reversed by the reverse portion 136 is re-conveyed to the transfer rollers 114 through a re-conveyance path 138, and an image is formed on a second surface of the sheet S. The sheet S with an image formed thereon in one-sided printing or the sheet S with an image formed on the second surface of the sheet S in two-sided printing is discharged from the image forming apparatus 100 by discharge rollers 139*a* of the discharge conveyance path 139. A switch flap 134 for guiding the sheet S reversed by the reverse portion 136 to the discharge conveyance path 139 is arranged between the reverse conveyance path 135 and the discharge conveyance path 139, so that the front or back of the sheet S in discharging the sheet S from the image forming apparatus 100 is selectable. An image reading apparatus 190 for reading image information from documents is arranged on top of the image forming apparatus 100. The sheet S discharged from the image forming apparatus 100 by the discharge rollers 139*a* is conveyed to the finisher 600. The sheet S conveyed to the finisher 600 undergoes predetermined processing by a processing unit 601 in the finisher 600, and thereafter the resultant sheet S is stacked as a product on a tray 602*a* or 600*b* of the finisher 600. The processing by the processing unit 601 herein is, for example, binding processing of binding a plurality of sheets S together and/or punching processing of punching a sheet S.

Figure 2A:
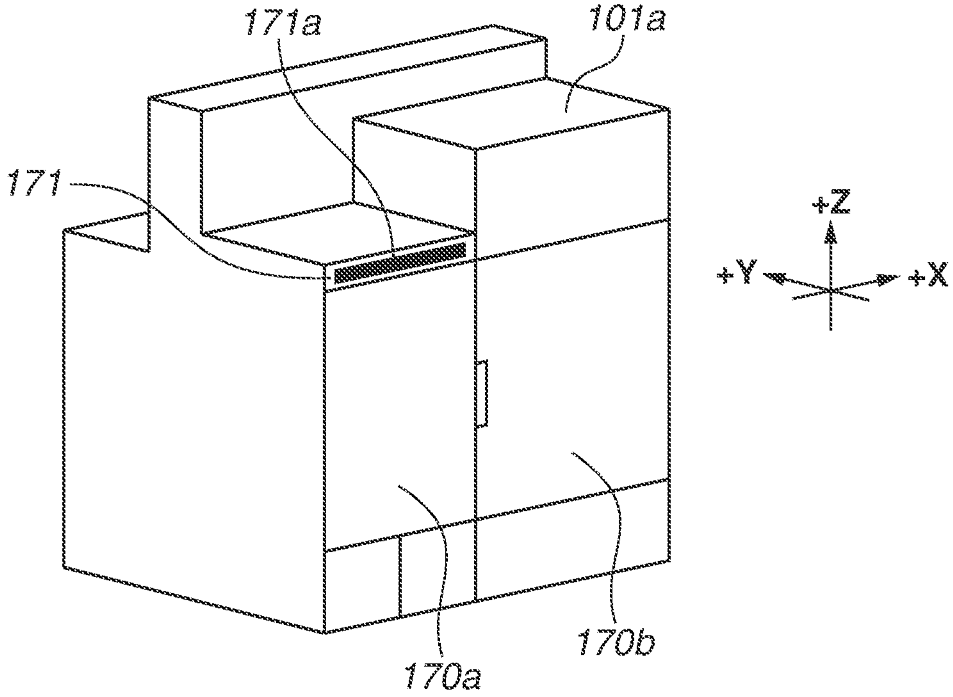
FIG. 2A is a left-side perspective view illustrating the image forming apparatus with a front door closed.

Next, an airflow structure of the first housing 101*a* of the image forming apparatus 100 will be described below with reference to FIG. 1 and FIGS. 2A to 7. As illustrated in FIG. 2A, a left-front door 170*a* and a right-front door 170*b* which are outside covers forming part of an exterior of the image forming apparatus 100 are provided on a front side of the first housing 101*a*. As illustrated, the left-front door 170*a* and the right-front door 170*b* are openable and closeable and are a set of double doors that meet substantially the center in a horizontal direction. The left-front door 170*a* and the right-front door 170*b* are an example of a first cover forming part of the exterior of the image forming apparatus 100. The left-front door 170*a* (the right-front door 170*b*) is a door provided in a front side of the image forming apparatus 100.

An air intake cover 171 forming part of the exterior of the image forming apparatus 100 is arranged on top of the left-front door 170*a*, and the air intake cover 171 includes an air intake 171*a* facing the front.

Figure 2B:
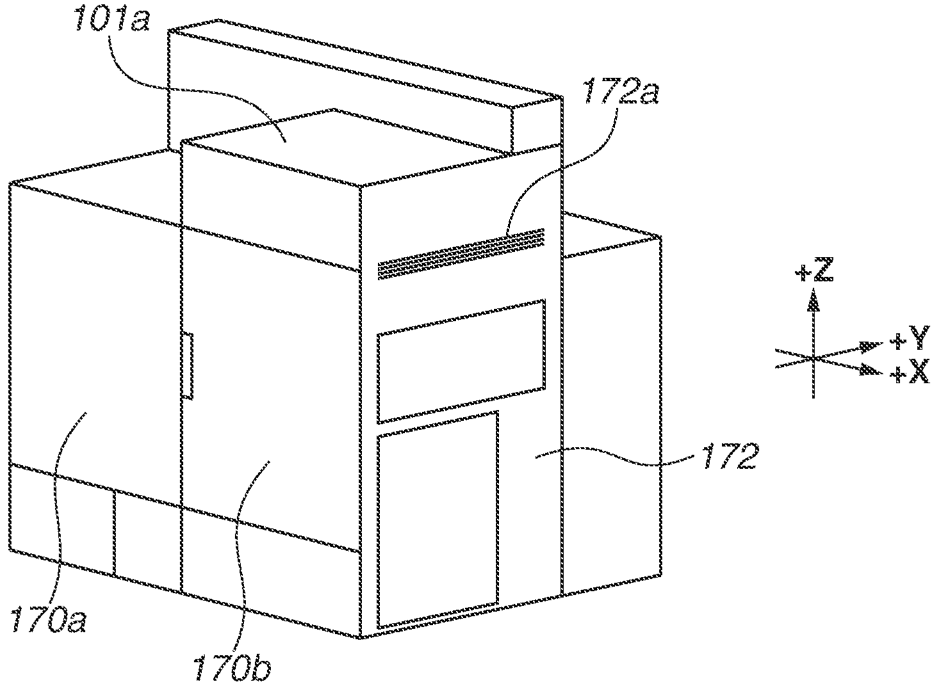
FIG. 2B is a right-side perspective view illustrating the image forming apparatus with the front door closed.

As illustrated in FIG. 2B, a right cover 172 forming part of the exterior of the image forming apparatus 100 is provided to a right side of the first housing 101*a*, and an air intake 172*a* is formed in the right cover 172. The air intake 171*a* is an example of a first air intake, and the air intake 172*a* is an example of a second air intake.

<Air Blowing Unit>

Figure 3:
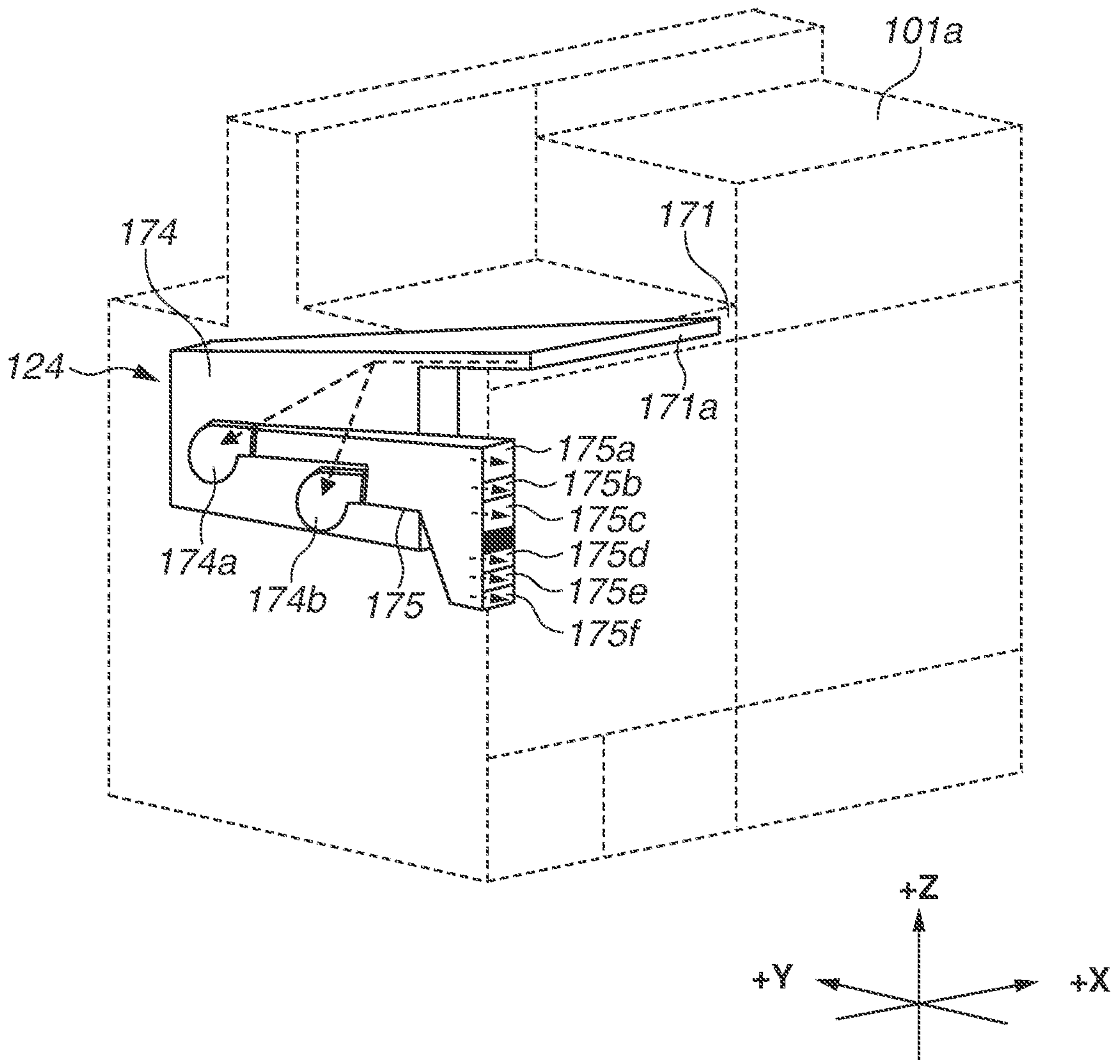
FIG. 3 is a perspective view illustrating a left-side air blowing unit.

As illustrated in FIG. 3, a left-side air blowing unit 124 including a fan for absorbing air through the air intake 171*a* and blowing the air is arranged on a left side of the first housing 101*a*. In FIG. 3, the housing 101*a* is indicated by broken lines, and units that generate an airflow are indicated by solid lines for description. The left-side air blowing unit 124 includes a left-side body duct 174, air blowing fans 174*a* and 174*b*, and a side-surface duct 175. Air absorbed through the air intake 171*a* is blown toward development devices 112*a* to 112*d* and charging devices 111*a* and 111*b* supported by the first housing 101*a* through the left-side air blowing unit 124 and an internal cover unit 200 described below. The left-side body duct 174 herein is a duct including therein a space which communicates with the air intake 171*a*.

The air blowing fans 174*a* and 174*b* and the side-surface duct 175 are arranged on a left side of the left-side body duct 174. More specifically, the left-side body duct 174 includes a communication opening which communicates with the air blowing fans 174*a* and 174*b*, and as the air blowing fans 174*a* and 174*b* operate, air absorbed through the air intake 171*a* is passed through the inside of the left-side body duct 174. The air absorbed through the air intake 171*a* is passed through a filter (not illustrated) to remove dust in the air.

While not illustrated in the present disclosure, four air blowing fans (not illustrated) are provided on an opposite side of the side where the side-surface duct 175, provided on the left-side body duct 174, is provided. Each of the four air blowing fans (not illustrated) is capable of absorbing air from the outside of the image forming apparatus 100 through the air intake 171*a*.

The side-surface duct 175 includes therein ducts 175*a* to 175*f* for branching airflows generated by the air blowing fans 174*a* and 174*b*. Air absorbed by the air blowing fans 174*a* and 174*b* and four air blowing fans (not illustrated) is passed through the ducts 175*a* to 175*f* (refer to broken arrows) and blown to the internal cover unit 200 described below. The air blowing fan 174*a* is an example of a first fan arranged outside of the image forming units 120 to 123 in an arrangement direction of the plurality of image forming units 120 to 123.

Figure 4:
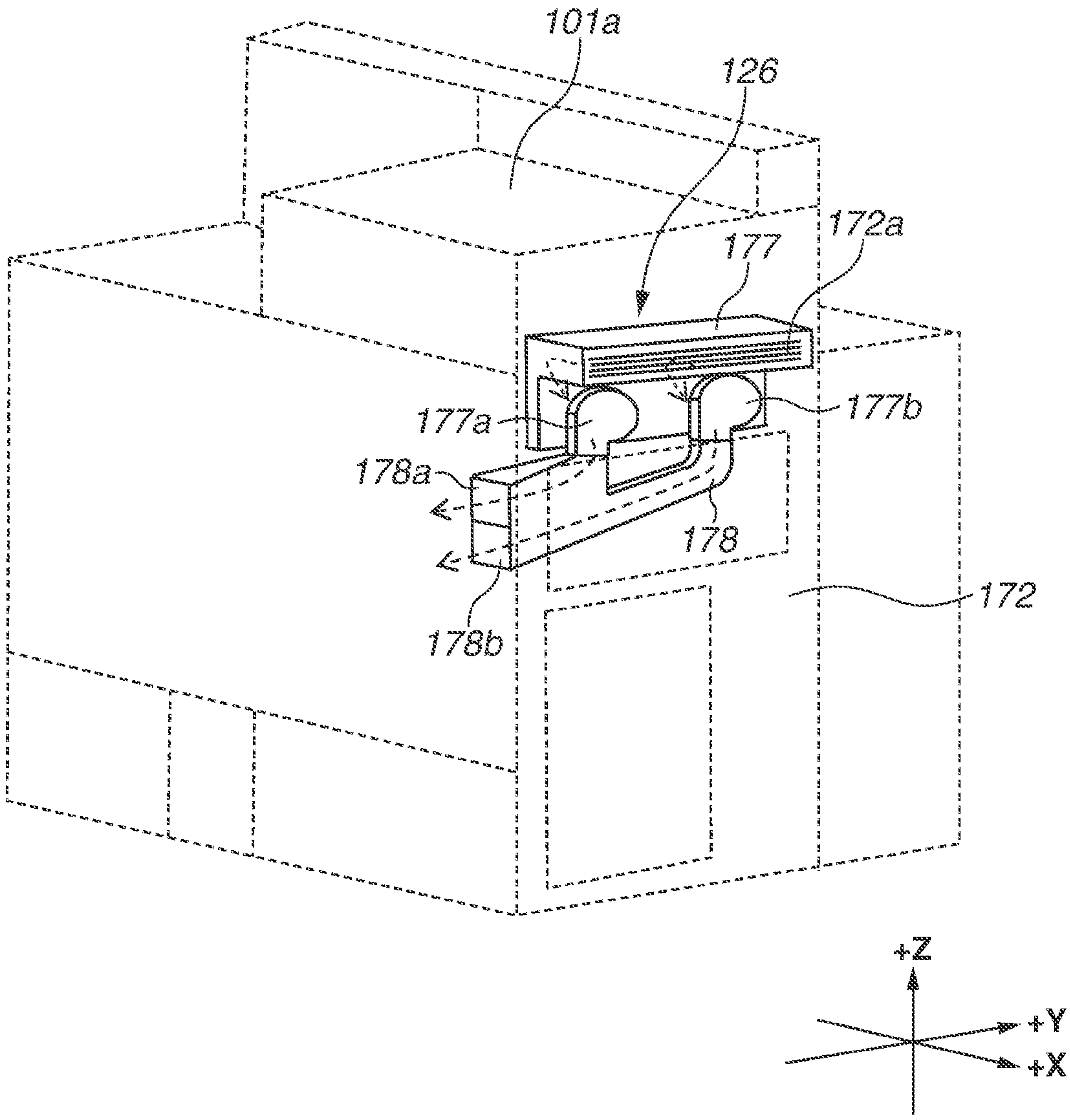
FIG. 4 is a perspective view illustrating a right-side air blowing unit.

As illustrated in FIG. 4, a right-side air blowing unit 126 including a fan for absorbing air through the air intake 172*a* and blowing the air is arranged by the right side of the first housing 101*a*. The right-side air blowing unit 126 includes a right-side body duct 177, air blowing fans 177*a* and 177*b*, and a passage duct 178. Air absorbed through the air intake 172*a* is blown toward charging devices 111*c* and 111*d* supported by the first housing 101*a* through the right-side air blowing unit 126 and the internal cover unit 200 described below. The right-side body duct 177 is provided with ducts 178*a* and 178*b*. The ducts 178*a* and 178*b* communicate with the air intake 172*a* formed in a right side of the image forming apparatus 100 and branch airflows from the air blowing fans 177*a* and 177*b*. The air blowing fan 177*a* is an example of a second fan arranged on an opposite side of the image forming units 120 to 123 from the air blowing fan 174*a* in the arrangement direction of the plurality of image forming units 120 to 123.

The air blowing fans 177*a* and 177*b* and the passage duct 178 are arranged on the right side of the right-side body duct 177. More specifically, the right-side body duct 177 includes a communication opening that communicates with the air blowing fans 177*a* and 177*b*, and as the air blowing fans 177*a* and 177*b* operate, air absorbed through the air intake 172*a* is passed through the inside of the right-side body duct 177. The air absorbed through the air intake 172*a* is passed through a filter (not illustrated) to remove dust in the air. The passage duct 178 includes therein the ducts 178*a* and 178*b* for branching airflows generated inside by the air blowing fans 177*a* and 177*b*. The passage duct 178 and the air blowing fans 177*a* and 177*b* are connected so that air having passed through the air blowing fans 177*a* and 177*b* passes through the ducts 178*a* and 178*b* (refer to broken arrows). The air blowing fans 174*a*, 174*b*, 177*a*, and 177*b* are, for example, sirocco fans.

As described above, the plurality of air blowing fans for absorbing air through the air intakes 171*a* and 172*a* is arranged on the right and left sides of the first housing 101*a* as illustrated in FIGS. 3 and 4.

The locations of the air blowing fans are distant from the front where a user operating an operation unit 180 is. Thus, the operator is less likely to be affected by noise of the fans. Since an increase in size of the front of a body of the image forming apparatus 100 is prevented, the degree of freedom in design increases. Furthermore, while air ejected from the back of the body of the image forming apparatus 100 is high in temperature due to waste heat, the provision of the air intakes 171*a* and 172*a* on the front and both sides of the image forming apparatus 100 prevents absorption of air containing heat and ejected from the image forming apparatus 100. This prevents a decrease in cooling efficiency in the image forming apparatus 100.

Figure 5A:
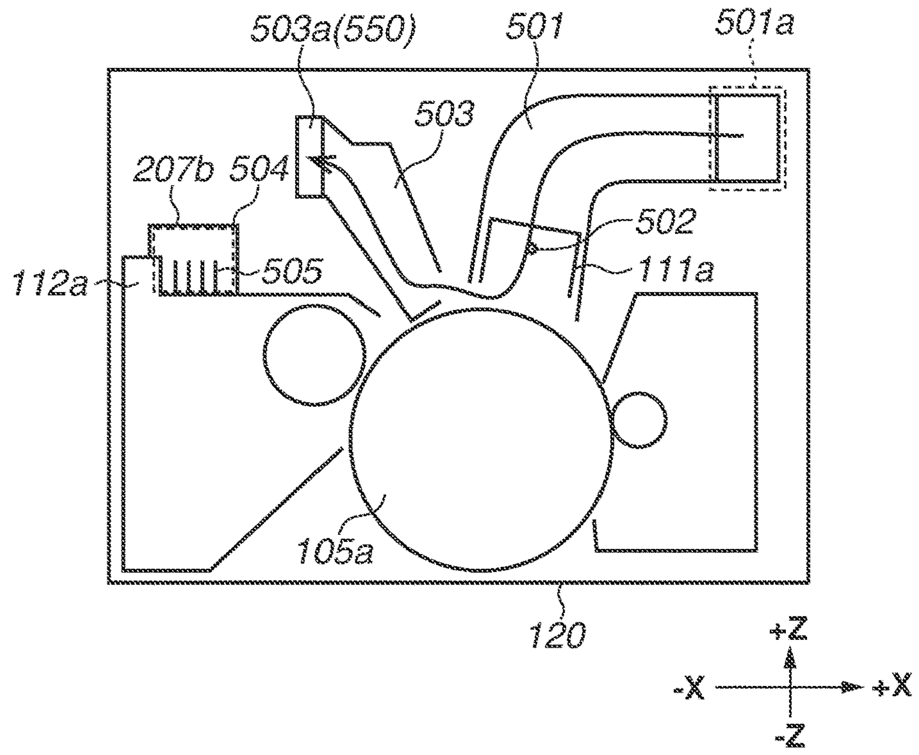
FIGS. 5A and 5B are schematic sectional views illustrating an image forming unit.
Figure 5B:
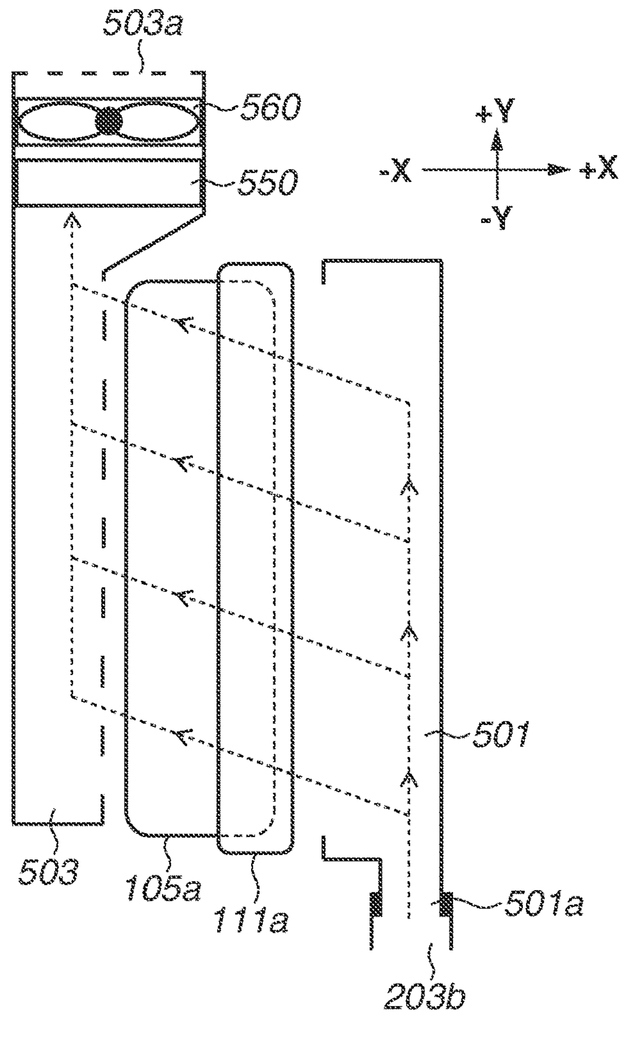

FIGS. 5A and 5B illustrate an airflow structure with respect to the image forming unit 120 as an example. Airflow structures for the image forming units 121 to 123 are similar to the airflow structure for the image forming unit 120, so that descriptions thereof are omitted. FIG. 5A is a sectional view of the image forming unit 120 viewed from the front. FIG. 5B is a sectional view of the image forming unit 120 viewed from the top.

Air passed through an outlet 203*b* of the ducts provided to the internal cover unit 200 described below arrives at a duct 501 through a duct air intake 501*a*.

The charging device 111*a* charges the surface of the photosensitive member 105*a* by ionizing air surrounding the charging wire 502 and generating ions by a corona discharge process. At this time, the charging device 111*a* generates not only ions but also ozone. Since ozone often causes corrosion of, for example, a stainless-steel grid (not illustrated) of the charging device 111*a*, the generated ozone is to be collected.

Thus, in order to convey the ozone using air to an ozone collection filter 550 to collect the ozone, a duct 501 for blowing air to the charging device 111*a* and an exhaust duct 503 for ejecting air to the outside through the ozone collection filter 550 are arranged near the charging device 111*a*. The exhaust duct 503 is provided with an exhaust fan 560, and as the exhaust fan 560 is rotated, the air having passed through the ozone collection filter 550 is passed through an exhaust opening 503*a* and ejected from the image forming apparatus 100.

The development device 112*a* is provided with a heatsink 505 made of aluminum and a cooling duct 504. While passing through the cooling duct 504, air conveyed through an outlet 207*b* of ducts of the internal cover unit 200 described below passes through the heatsink 505 so that heat is adsorbed and a development device 112*a* is cooled. The air having passed through the cooling duct 504 is ejected from the image forming apparatus 100 by an exhaust fan (not illustrated).

<Internal Cover Unit>

Figure 6:
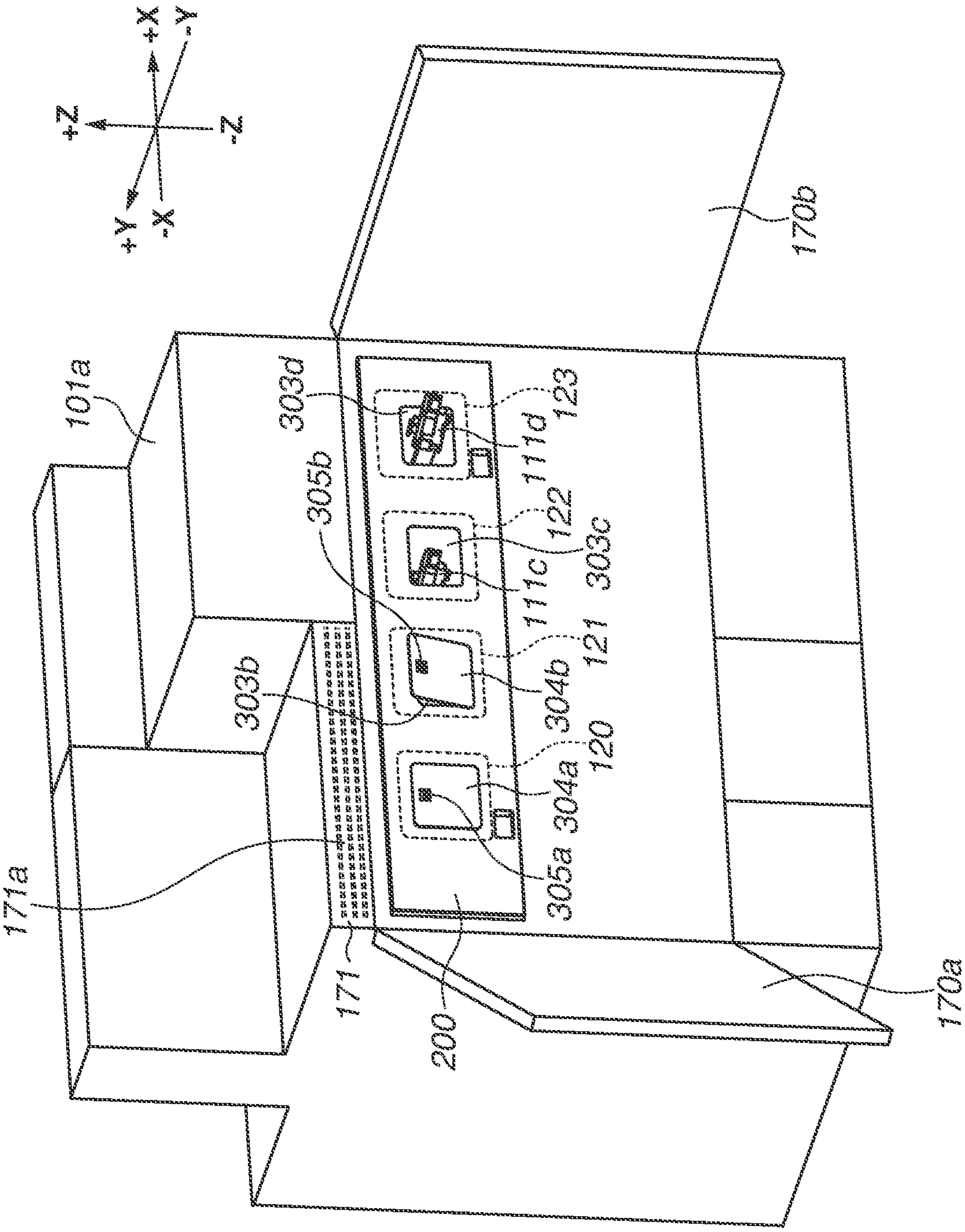
FIG. 6 is a perspective view illustrating a state where a left-front door and a right-front door is opened.
Figure 7:
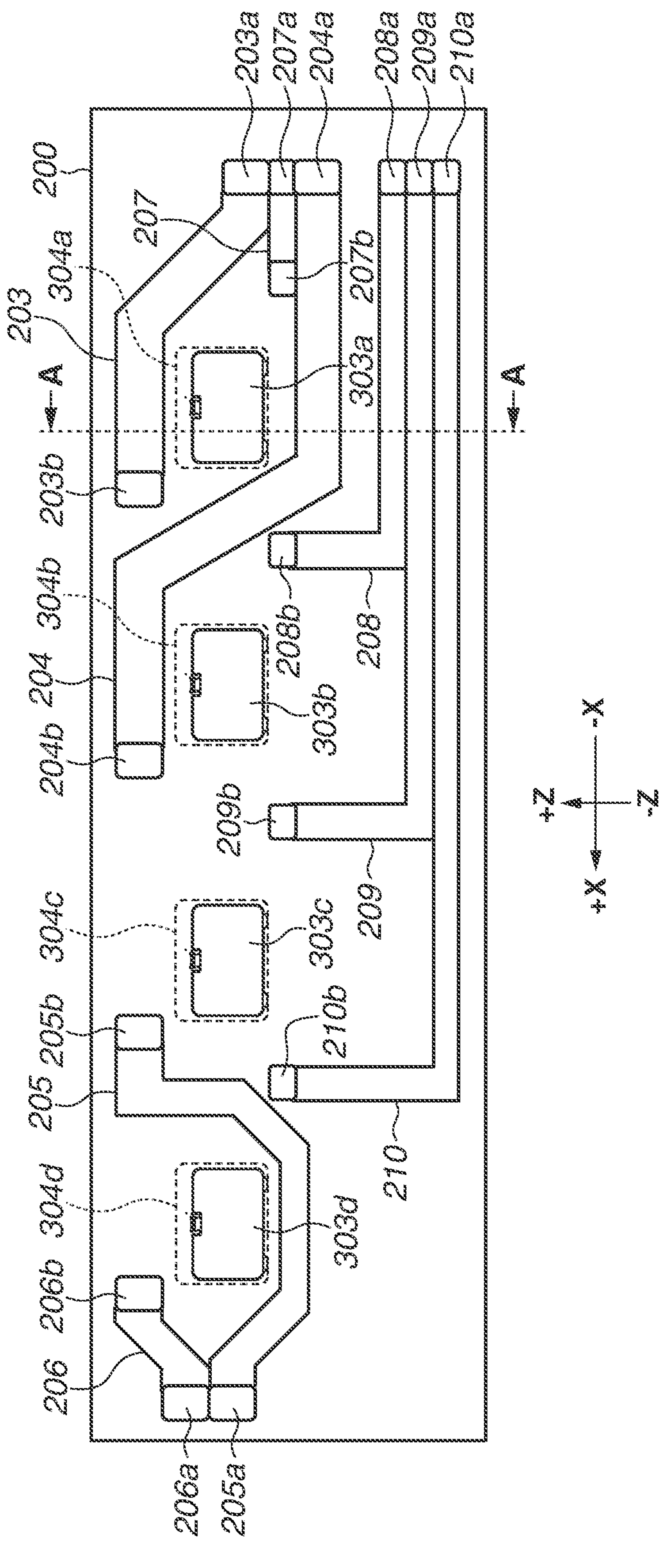
FIG. 7 is a schematic diagram illustrating a structure of an internal cover unit.

Next, the internal cover unit 200 will be described below with reference to FIGS. 6 and 7. FIG. 6 is a perspective view illustrating a state where the left-front door 170*a* and the right-front door 170*b* are opened. FIG. 7 is a schematic diagram illustrating a detailed structure of the internal cover unit 200.

As illustrated in FIG. 6, the internal cover unit 200 is arranged inside the left-front door 170*a* and the right-front door 170*b* to cover the image forming units 120 to 123 arranged in parallel in the first housing 101*a*. More specifically, the image forming units 120 to 123 are arranged in parallel further inside the internal cover unit 200 (at the back of the image forming apparatus 100 (+Y side)) (as specified by broken lines). In other words, the internal cover unit 200 is arranged between the left- and right-front doors 170*a* and 170*b* and the image forming units 120 to 123 in a rotational axis direction of the photosensitive member 105*a*. The internal cover unit 200 is an example of a second cover. Moreover, the internal cover unit 200 is an example of a shield member.

The internal cover unit 200 is provided to prevent a user from accidentally touching a power portion and a movable portion arranged at positions covered by the internal cover unit 200, such as the image forming units 120 to 123, in a case where the left-front door 170*a* and the right-front door 170*b* are opened by the user. This prevents the user from accidentally touching internal components, such as a movable portion and an electric wire, in a case where the user opens the left-front door 170*a* and the right-front door 170*b* and to fix a paper jam. Note that the internal cover unit 200 is removably attached to the first housing 101*a* so that a serviceperson can perform maintenance operations, for example.

The image forming units 120 and 121 are supported by the first housing 101*a* at positions facing the left-front door 170*a* in a closed state, and the image forming units 122 and 123 are supported by the first housing 101*a* at positions facing the right-front door 170*b* in a closed state. In other words, the image forming units 120 and 121 are arranged to the left side from the center as viewed from the front, and the image forming units 122 and 123 are arranged to the right side from the center as viewed from the front.

The internal cover unit 200 has a rectangular shape that is long in a width direction (X direction) of the image forming apparatus 100 to cover the image forming units 120 to 123 arranged in parallel in the width direction of the image forming apparatus 100. According to the present disclosure, the width direction (X direction) of the image forming apparatus 100 is an example of the arrangement direction of the plurality of image forming units 120 to 123.

The internal cover unit 200 is provided with a plurality of ducts for blowing air to the image forming units 120 to 123 as illustrated in FIG. 7. FIG. 7 is a schematic diagram illustrating a surface of the internal cover unit 200 that faces the image forming units 120 to 123.

The internal cover unit 200 is provided with, as ducts for blowing air to the image forming unit 120, a duct 203 for blowing air to the charging device 111*a* and a duct 207 for blowing air to the development device 112*a*. The internal cover unit 200 is provided with, as ducts for blowing air to the image forming unit 121, a duct 204 for blowing air to a charging device 111*b* and a duct 208 for blowing air to a development device 112*b*. The internal cover unit 200 is provided with, as ducts for blowing air to the image forming unit 122, a duct 205 for blowing air to a charging device 111*c* and a duct 209 for blowing air to a development device 112*c*. The internal cover unit 200 is provided with, as ducts for blowing air to the image forming unit 123, a duct 206 for blowing air to the charging device 111*d* and a duct 210 for blowing air to the development device 112*d*.

The duct 203 is an example of a first duct arranged to guide air absorbed from outside of the image forming apparatus 100 through the air intake 171*a* to the image forming unit 120. The duct 206 is an example of a second duct arranged to guide air absorbed from outside of the image forming apparatus 100 through the air intake 172*a* to the image forming unit 123.

Air absorbed through the air intake 171*a* is absorbed into the ducts 203, 204, and 207 to 210 through the left-side air blowing unit 124. The duct 203 includes an inlet 203*a* and the outlet 203*b*. The inlet 203*a* is coupled to the duct 175*a* of the side-surface the duct 175 so that air flows from the duct 175*a* into the duct 203 through the inlet 203*a*. Air in the duct 203 flows into the duct air intake 501*a* of the charging device 111*a* through the outlet 203*b*. The duct 175 is an example of a first body duct, and the duct 501 is an example of a second body duct. The inlet 203*a* is an example of a first coupling portion coupled to the duct 175*a*, and the outlet 203*b* is an example of a second coupling portion coupled to the duct 501. The duct air intake 501*a* of the duct 501 is an example of a third coupling portion coupled to the outlet 203*b*.

The duct 204 includes an inlet 204*a* and an outlet 204*b*. The inlet 204*a* is coupled to the duct 175*c* of the side-surface the duct 175 so that air flows from the duct 175*c* into the duct 204 through the inlet 204*a*. Air in the duct 204 flows into a duct air intake 501*b* of the charging device 111*b* through the outlet 204*b*.

The duct 207 includes an inlet 207*a* and the outlet 207*b*. The inlet 207*a* is coupled to the duct 175*b* of the side-surface the duct 175 so that air flows from the duct 175*b* into the duct 207 through the inlet 207*a*. Air in the duct 207 flows into the cooling duct 504 of the development device 112*a* through the outlet 207*b*. The duct 208 includes an inlet 208*a* and an outlet 208*b*. The inlet 208*a* is coupled to the duct 175*d* of the side-surface the duct 175 so that air flows from the duct 175*d* into the duct 208 through the inlet 208*a*. Air in the duct 208 flows into an air intake of the cooling duct 504 of the development device 112*b* through the outlet 208*b*. The duct 209 includes an inlet 209*a* and an outlet 209*b*. The inlet 209*a* is coupled to the duct 175*e* of the side-surface the duct 175 so that air flows from the duct 175*e* into the duct 209 through the inlet 209*a*. Air in the duct 209 flows into an air intake of the cooling duct 504 of the development device 112*c* through the outlet 209*b*. The duct 210 includes an inlet 210*a* and an outlet 210*b*. The inlet 210*a* is coupled to the duct 175*f* of the side-surface the duct 175 so that air flows from the duct 175*f* into the duct 210 through the inlet 210*a*. Air in the duct 210 flows into an air intake of the cooling duct 504 of the development device 112*d* through the outlet 210*b*. The duct 203 is an example of a first duct arranged to guide air absorbed through the air intake 171*a* to the charging device 111*a* of the image forming unit 120. The duct 207 is an example of a third duct arranged to guide air absorbed through the air intake 171*a* to the development device 112*a* of the image forming unit 120.

Meanwhile, air absorbed through the air intake 172*a* is absorbed into the ducts 205 and 206 through the right-side air blowing unit 126. The duct 205 includes an inlet 205*a* and an outlet 205*b*. The inlet 205*a* is coupled to the duct 178*b* of the passage duct 178 so that air flows from the duct 178*b* into the duct 205 through the inlet 205*a*. Air in the duct 205 flows into a duct air intake 501*c* of the charging device 111*c* through the outlet 205*b*. The duct 206 includes an inlet 206*a* and an outlet 206*b*. The inlet 206*a* is coupled to the duct 178*a* of the passage duct 178 so that air flows from the duct 178*a* into the duct 206 through the inlet 206*a*. Air in the duct 206 flows into a duct air intake 501*d* of the charging device 111*d* through the outlet 206*b*. The duct 207 is an example of a first duct arranged to guide air absorbed through the air intake 171*a* to the development device 112*a* of the image forming unit 120.

As described above, the plurality of ducts 203 to 210 of the internal cover unit 200 each communicates with the side-surface the duct 175 or the passage duct 178, thus absorbing air from outside of the image forming apparatus 100. The plurality of ducts 203 to 210 of the internal cover unit 200 enables absorption of air into each development device and each charging device of the image forming units 120 to 123.

The internal cover unit 200 is made of resin, and the plurality of ducts 203 to 210 is also made of resin. While the internal cover unit 200 including eight ducts is described above, the number and shape of the ducts are not limited to those described above. For example, in a case where another image forming unit that forms images using toner of another color, such as gold or silver, is further included, a duct for the other image forming unit may be provided. While the plurality of ducts 203 to 210 each provided with an air blowing fan is described above, air to be blown to the plurality of ducts may be absorbed with a single fan.

As described above, the internal cover unit 200 is provided with the ducts for blowing air to the image forming units 120 to 123 so that the fans for blowing air can be arranged outside of the image forming units 120 to 123 in a width direction of the housing 101*a*. This prevents noise caused by arrangement of the air blowing fans on the front side of the image forming apparatus 100 as described above and also prevents an increase in size of the image forming apparatus 100 in front-back direction.

As described above, the internal cover unit 200 covers the plurality of image forming units 120 to 123 and includes a plurality of ducts for blowing air to the plurality of image forming units 120 to 123. Thus, the internal cover unit 200 is larger in size than the image forming units 120 to 123 alone. With such a structure, an operation of removing the internal cover unit 200, which is large, is to be performed each time a part of the image forming units 120 to 123 is to be maintained. The operation of removing the internal cover unit 200, which is large, each time is a great burden in maintenance operations and causes a decrease in operability.

Thus, the internal cover unit 200 has openings 303*a* to 303*d* through which at least a part of the image forming units 120 to 123 can singly be inserted and extracted as illustrated in FIGS. 6 and 7. Moreover, small covers 304*a* to 304*d* covering the openings 303*a* to 303*d* are included so that the small covers 304*a* to 304*d* are attachable to and detachable from the internal cover unit 200.

Thus, maintenance operations on the image forming units 120 to 123 is performable without removing the internal cover unit 200, by opening the small covers 304*a* to 304*d*.

The maintenance of the image forming units 120 to 123 includes replacement of the charging devices 111*a* to 111*d*. The charging devices 111*a* to 111*d* are shorter in life of parts than other parts of the image forming units 120 to 123, such as the photosensitive members 105*a* to 105*d* and the development devices 112*a* to 112*d*. Thus, the charging devices 111*a* to 111*d* are replaced more frequently than the other parts.

Thus, with the small cover 304*a* removed, the charging device 111*a* of the image forming unit 120 can be inserted and extracted through the opening 303*a*. With the small cover 304*b* removed, the charging device 111*b* of the image forming unit 121 can be inserted and extracted through the opening 303*b*. With the small cover 304*c* removed, the charging device 111*c* of the image forming unit 122 can be inserted and extracted through the opening 303*c*. With the small cover 304*d* removed, the charging device 111*d* of the image forming unit 123 can be inserted and extracted through the opening 303*d*. The small cover 304*a* is an example of a third cover that covers the opening 303*a* and is attachable to and detachable from the internal cover unit 200. The small cover 304*d* is an example of a fourth cover that covers the opening 303*d* and is attachable to and detachable from the internal cover unit 200.

Meanwhile, FIG. 6 illustrates a state where the small cover 304*a* for the image forming unit 120 is closed and the small cover 304*b* is slightly opened with respect to the opening 303*b* for the image forming unit 121. Further, the small cover 304*c* for the image forming unit 122 is removed and the charging device 111*c* of the image forming unit 122 is exposed from the opening 303*c* in the illustrated state. Further, the charging device 111*d* of the image forming unit 123 is being removed through the opening 303*c* in the illustrated state.

As described above, the charging devices 111*a* to 111*d*, which are maintenance parts of the image forming units 120 to 123, of the image forming apparatus 100 according to the present disclosure can be inserted and extracted without removing the internal cover unit 200, and the charging devices 111*a* to 111*d* can be replaced.

This makes it unnecessary to attach or detach the internal cover unit 200 which covers the plurality of image forming units 120 to 123 and includes ducts each time a maintenance operation is performed, so that operability in performing a maintenance operation on the maintenance parts of the image forming units 120 to 123 improves.

Next, a procedure of removing the charging devices 111*a* to 111*d* will be described below with reference to FIGS. 8A, 8B, 9A, and 9B. A common removal procedure is applied to the charging devices 111*a* to 111*d*, and thus, only the charging device 111*a* will be described as an example. FIGS. 8A, 8B, 9A, and 9B are sectional views taken along A-A line in FIG. 7.

Figure 8B:
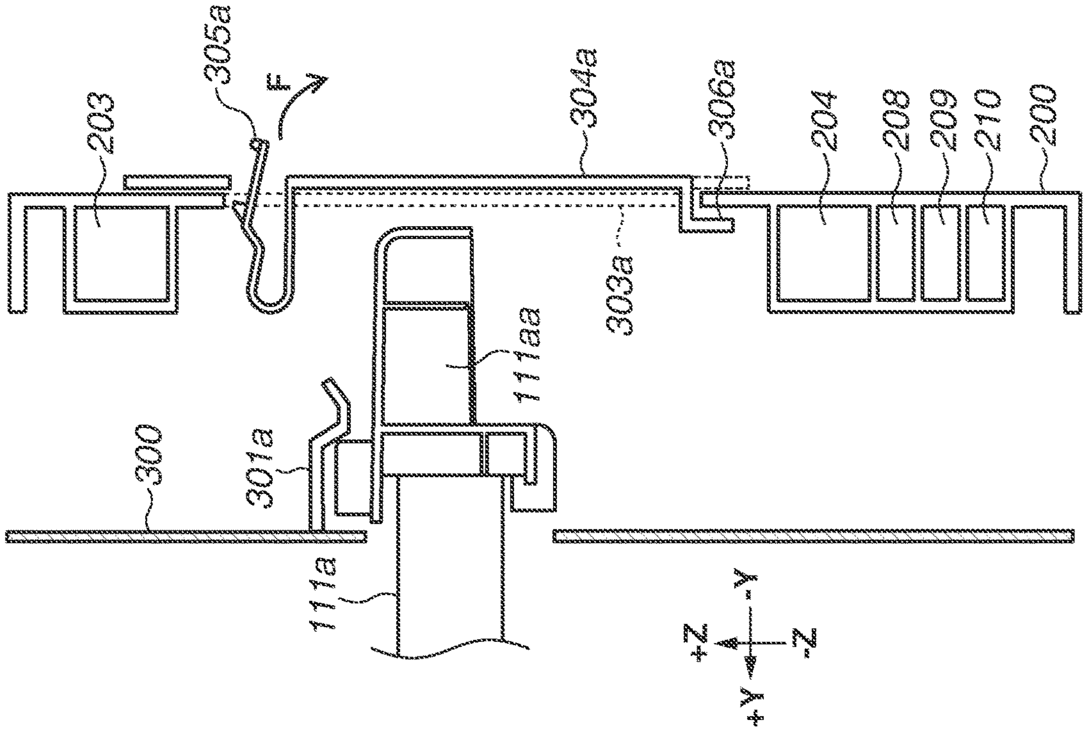
FIGS. 8A and 8B are sectional views illustrating a procedure of removing a primary charging device.
Figure 8A:
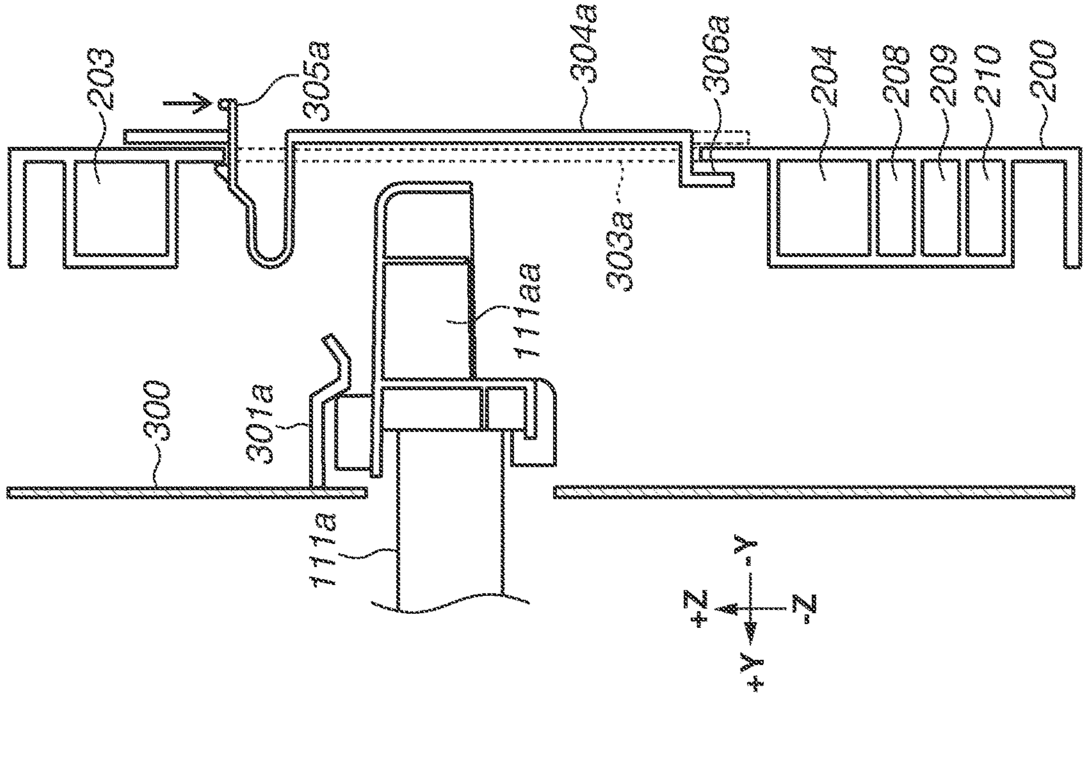

In removing the charging device 111*a* from the image forming apparatus 100, initially, a nail portion 305*a* of the small cover 304*a* is manually pressed in a downward direction (−Z direction) in FIG. 8A to disengage from the internal cover unit 200 as illustrated in FIG. 8B. The small cover 304*a* is pivoted on a lower end portion 306*a* of the small cover 304*a* in a direction of an arrow F specified in FIG. 8B so that the small cover 304*a* is removable from the internal cover unit 200. While the small cover 304*a* of the image forming apparatus 100 according to the present disclosure is attachable to and detachable from the internal cover unit 200, the small cover 304*a* may be pivotable on the internal cover unit 200 between an open state where the opening 303*a* is exposed and a closed state where the opening 303*a* is blocked.

Figure 9A:
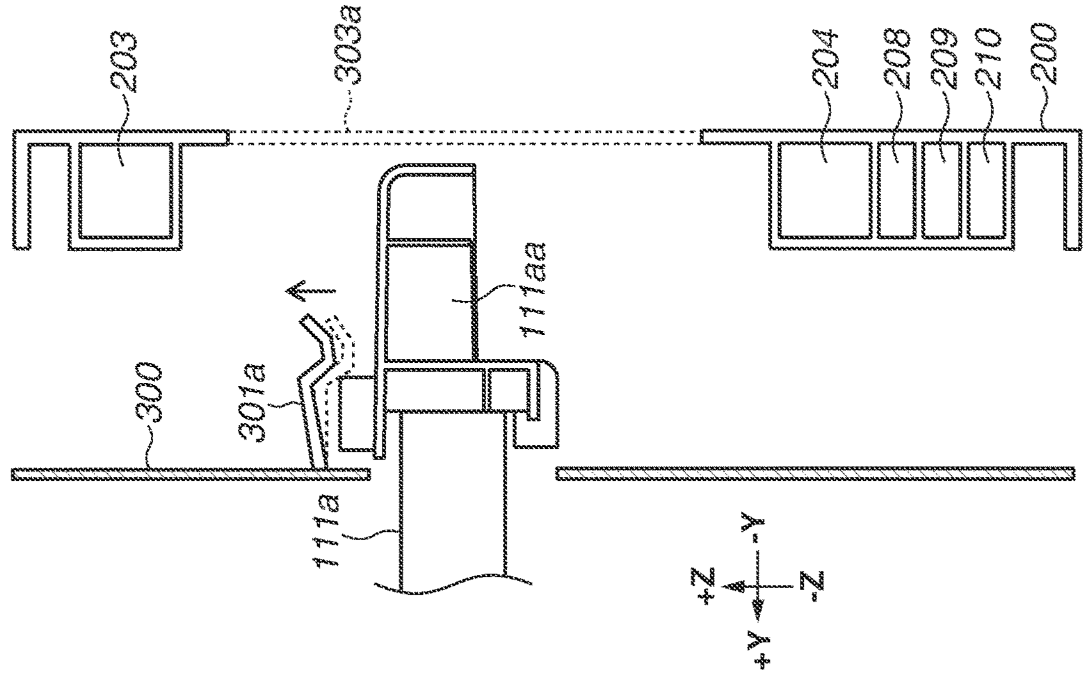
FIGS. 9A and 9B are sectional views illustrating a procedure of removing a primary charging device.
Figure 9B:
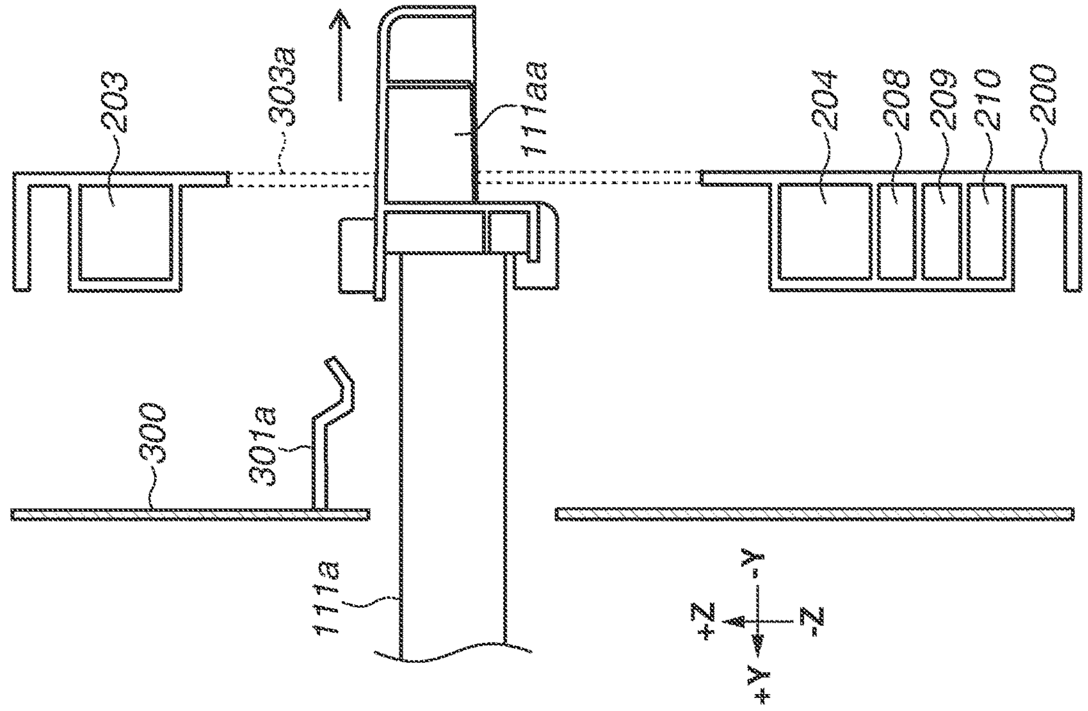

Next, as illustrated in FIG. 9A, a plate spring 301*a* of a front-side frame 300 of the first housing 101*a* is elastically deformed in an upward direction (+Z direction) in FIG. 9A so that the charging device 111*a* can be pulled out of the housing 101*a*. As illustrated in FIG. 9B, a finger is inserted in a finger-hook portion 111*aa* of the charging device 111*a* to pull the charging device 111*a* in a rightward direction (−Y direction) in FIG. 9B. This makes it possible to remove the charging device 111*a* from the first housing 101*a* of the image forming apparatus 100 without removing the internal cover unit 200.

This makes it unnecessary to attach or detach the internal cover unit 200 covering the plurality of image forming units 120 to 123 and including ducts each time a maintenance operation is to be performed, so that operability in performing a maintenance operation on the maintenance parts of the image forming units 120 to 123 improves.

As illustrated in FIGS. 7 to 9B, the image forming apparatus 100 according to the present disclosure includes the ducts 203 to 210 in a different region from the region where the openings 303*a* to 303*d* of the internal cover unit 200 are formed. In other words, the openings 303*a* to 303*d* are formed in a different region from the region of the ducts 203 to 210.

The foregoing structure improves operability in performing a maintenance operation on the maintenance parts of the image forming units 120 to 123 even in a case where the internal cover unit 200 includes a plurality of ducts.

While the charging devices 111*a* to 111*d* are described above as maintenance parts of the image forming units 120 to 123 of the image forming apparatus 100 according to the present disclosure, other parts can be inserted and extracted through the openings 303*a* to 303*d* in performing a maintenance operation on the other parts. For example, the dustproof glass, which is a transparent member and not illustrated, of the laser scanner unit 107*a* transparent member may be inserted and extracted through the openings 303*a* to 303*d*. This facilitates operations of removing foreign particles attached to a surface of the dustproof glass, on which a maintenance operation is performed less frequently than other parts, and facilitates replacement of the dustproof glass.

The maintenance operations on the image forming units 120 to 123 may include maintenance operations on other parts, and the internal cover unit 200 may have an opening through which the image forming units 120 to 123 can be inserted and extracted. In a case where the image forming units 120 to 123 are different in maintenance frequency from each other, an opening and a small cover may be provided at a position corresponding only to an image forming unit with a high maintenance frequency.

The area of an opening of the internal cover unit 200 can be reduced by forming an opening only at a position corresponding to a part with a high maintenance frequency as in the image forming apparatus 100 described above. This increases the area of regions where ducts of the internal cover unit 200 are to be formed. This makes it possible to blow a sufficient amount of air even in an image forming apparatus for industrial printing that necessitates a great amount of air to be blown to each of the image forming units 120 to 123.

With an image forming apparatus according to the present disclosure, a decrease in operability in performing a maintenance operation on an image forming unit is prevented even in a case where an inside cover covering a plurality of image forming units is provided with ducts.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-052238, filed Mar. 28, 2022, which is hereby incorporated by reference herein in its entirety.

What is claimed is:

1. An image forming apparatus comprising:

a first image forming unit of a plurality of image forming units, wherein the first image forming unit includes a first photosensitive member, a first charging unit configured to charge the first photosensitive member, a first exposure unit configured to expose the first photosensitive member charged by the first charging unit to form an electrostatic latent image on the first photosensitive member, and a first development unit configured to develop the electrostatic latent image formed on the first photosensitive member with toner;

a second image forming unit of the plurality of image forming units, wherein the second image forming unit includes a second photosensitive member, a second charging unit configured to charge the second photosensitive member, a second exposure unit configured to expose the second photosensitive member charged by the second charging unit to form an electrostatic latent image on the second photosensitive member, and a second development unit configured to develop the electrostatic latent image formed on the second photosensitive member with toner;

a first cover configured to be opened and closed and forming part of an exterior of the image forming apparatus;

a second cover located between the first cover and the plurality of image forming units in a rotational axis direction of the first photosensitive member, wherein the second cover is made of resin and covers the plurality of image forming units;

an air intake including a first air intake and a second air intake;

a first duct disposed on the second cover and configured to guide air sucked from outside of the image forming apparatus through the first air intake to the first image forming unit;

a second duct disposed on the second cover and configured to guide air sucked from the outside of the image forming apparatus through the second air intake to the second image forming unit;

a third cover configured to be attached, in an attachable and detachable manner, to the second cover to cover an opening of the second cover, wherein at least part of the first image forming unit is insertable and extractable through the opening of the second cover;

a first fan configured to suck air into the first duct through the first air intake, wherein the first fan is arranged outside of the plurality of image forming units in an arrangement direction of the plurality of image forming units; and a second fan configured to suck air to be fed to the second duct through the second air intake, wherein the second fan is arranged on a side of the plurality of image forming units that is opposite in the arrangement direction of the plurality of image forming units from a side of the plurality of image forming units on which the first fan is arranged.

2. The image forming apparatus according to claim 1, wherein the first duct guides the air sucked through the air intake to the first charging unit of the first image forming unit.

3. The image forming apparatus according to claim 1, wherein the first duct guides the air sucked through the air intake to the first development unit of the first image forming unit.

4. The image forming apparatus according to claim 3, further comprising a third duct configured to guide the air sucked through the air intake to the first charging unit of the first image forming unit.

5. The image forming apparatus according to claim 1, wherein the first charging unit is insertable to and extractable from the image forming apparatus through the opening of the second cover.

6. The image forming apparatus according to claim 1, wherein the first exposure unit includes a transparent member and is configured to expose the first photosensitive member by illuminating the first photosensitive member with laser light through the transparent member, and wherein the transparent member is insertable to and extractable from the image forming apparatus through the opening of the second cover.

7. The image forming apparatus according to claim 1, further comprising a fourth cover attached, in an attachable and detachable manner, to the second cover to cover another opening of the second cover through which at least part of the second image forming unit is insertable and extractable.

8. The image forming apparatus according to claim 1, further comprising:

a first body duct configured to guide the air sucked through the air intake to the first duct; and a second body duct configured to guide air ejected from the first duct to the first charging unit, wherein the first duct includes a first coupling portion coupled to the first body duct and a second coupling portion coupled to the second body duct, wherein the second body duct includes a third coupling portion coupled to the second coupling portion, and wherein the third coupling portion is arranged not to overlap the opening of the second cover in the rotational axis direction of the first photosensitive member.

9. The image forming apparatus according to claim 1, wherein the first photosensitive member is configured to be charged from a corona discharge process performed by the first charging unit, and wherein the second photosensitive member is configured to be charged from a corona discharge process performed by the second charging unit.

10. An image forming apparatus comprising:

a first image forming unit of a plurality of image forming units, wherein the first image forming unit includes a first photosensitive member, a first charging unit configured to charge the first photosensitive member, a first exposure unit configured to expose the first photosensitive member charged by the first charging unit to form an electrostatic latent image on the first photosensitive member, and a first development unit configured to develop the electrostatic latent image formed on the first photosensitive member with toner;

a second image forming unit of the plurality of image forming units, wherein the second image forming unit includes a second photosensitive member, a second charging unit configured to charge the second photosensitive member, a second exposure unit configured to expose the second photosensitive member charged by the second charging unit to form an electrostatic latent image on the second photosensitive member, and a second development unit configured to develop the electrostatic latent image formed on the second photosensitive member with toner;

a first cover configured to be opened and closed and forming part of an exterior of the image forming apparatus;

a second cover located between the first cover and the plurality of image forming units in a rotational axis direction of the first photosensitive member, wherein the second cover is made of resin and covers the plurality of image forming units;

an air intake including a first air intake and a second air intake;

a first duct disposed on the second cover and configured to guide air sucked from outside of the image forming apparatus through the first air intake to the first image forming unit;

a second duct disposed on the second cover and configured to guide air sucked from the outside of the image forming apparatus through the second air intake to the second image forming unit; and a third cover configured to be attached, in an attachable and detachable manner, to the second cover to cover an opening of the second cover, wherein at least part of the first image forming unit is insertable and extractable through the opening of the second cover, wherein the first charging unit is insertable to and extractable from the image forming apparatus through the opening of the second cover.

11. The image forming apparatus according to claim 10, further comprising a fan configured to suck air into the first duct through the air intake.

12. The image forming apparatus according to claim 10, wherein the first duct guides the air sucked through the air intake to the first charging unit of the first image forming unit.

13. The image forming apparatus according to claim 10, wherein the first duct guides the air sucked through the air intake to the first development unit of the first image forming unit.

14. The image forming apparatus according to claim 13, further comprising a third duct configured to guide the air sucked through the air intake to the first charging unit of the first image forming unit.

15. The image forming apparatus according to claim 10, wherein the first exposure unit includes a transparent member and is configured to expose the first photosensitive member by illuminating the first photosensitive member with laser light through the transparent member, and wherein the transparent member is insertable to and extractable from the image forming apparatus through the opening of the second cover.

16. The image forming apparatus according to claim 10, further comprising a fourth cover attached, in an attachable and detachable manner, to the second cover to cover another opening of the second cover through which at least part of the second image forming unit is insertable and extractable.

17. The image forming apparatus according to claim 10, further comprising:

a first body duct configured to guide the air sucked through the air intake to the first duct; and a second body duct configured to guide air ejected from the first duct to the first charging unit, wherein the first duct includes a first coupling portion coupled to the first body duct and a second coupling portion coupled to the second body duct, wherein the second body duct includes a third coupling portion coupled to the second coupling portion, and wherein the third coupling portion is arranged not to overlap the opening of the second cover in the rotational axis direction of the first photosensitive member.

18. The image forming apparatus according to claim 10, wherein the first photosensitive member is configured to be charged from a corona discharge process performed by the first charging unit, and wherein the second photosensitive member is configured to be charged from a corona discharge process performed by the second charging unit.

* * * * *